United States Patent
Pedrazzini et al.

(10) Patent No.: US 11,628,441 B2
(45) Date of Patent: Apr. 18, 2023

(54) SYSTEM AND METHOD FOR TRACEABILITY OF TRANSPORT OF CONTAINERS OF BIOLOGICAL SAMPLES

(71) Applicant: Inpeco Holding Ltd., Qormi (MT)

(72) Inventors: Gianandrea Pedrazzini, Paradiso (CH); Riccardo Triunfo, Laveno-Mombello (IT)

(73) Assignee: Inpeco Holding Ltd., Qormi (MT)

( * ) Notice: Subject to any disclaimer, the term of this patent is extended or adjusted under 35 U.S.C. 154(b) by 344 days.

(21) Appl. No.: 16/755,967

(22) PCT Filed: Oct. 15, 2018

(86) PCT No.: PCT/IB2018/057973
§ 371 (c)(1),
(2) Date: Apr. 14, 2020

(87) PCT Pub. No.: WO2019/077469
PCT Pub. Date: Apr. 25, 2019

(65) Prior Publication Data
US 2020/0298239 A1    Sep. 24, 2020

(30) Foreign Application Priority Data
Oct. 16, 2017    (IT) .......................... 102017000116211

(51) Int. Cl.
*B01L 3/00*    (2006.01)
*B01L 9/06*    (2006.01)
(Continued)

(52) U.S. Cl.
CPC ................. *B01L 3/545* (2013.01); *B01L 9/06* (2013.01); *G06Q 10/0832* (2013.01); *G06Q 10/0833* (2013.01); *B01L 2300/021* (2013.01)

(58) Field of Classification Search
CPC ............ G06Q 10/0832; G06Q 10/0833; B01L 3/545; B01L 9/06; B01L 2300/021; B01L 2200/14; B01L 2200/185; B01L 2300/022
See application file for complete search history.

(56) References Cited

U.S. PATENT DOCUMENTS 5,098,663 A    3/1992    Berthold et al.
6,455,002 B1    9/2002    Jokes et al.
(Continued)

OTHER PUBLICATIONS

A. Zarabzadeh, F. Hayati, R. W. G. Watson, G. Bradley and J. Grimson, "Implementation of an RFID-based biological sample identification and tracking system," 2011 IEEE International Conference on RFID-Technologies and Applications, 2011, pp. 236-243, doi: 10.1109/RFID-TA.2011.6068644. (Year: 2011).*

(Continued)

*Primary Examiner* — Matthew Mikels
(74) *Attorney, Agent, or Firm* — RMCK Law Group PLC

(57) ABSTRACT

The invention relates to a system and method for traceability of transport of containers of biological samples, arranged in a containment rack, from a drawing point to an analysis point, in which a preparation apparatus is able, for each containment rack going out from the drawing point, to identify the containment rack, to detect the measurement of the outgoing mass of the containment rack and to store the measurement of the outgoing mass in a centralized database, and in which a check-in apparatus is able, for each containment rack coming to the analysis point, to identify the containment rack, to detect the measurement of the incoming mass of the containment rack and to compare the measurement of the outgoing mass with the detected measurement of the incoming mass, generating an alert if the measurement of the outgoing mass is different from the measurement of the incoming mass.

20 Claims, 4 Drawing Sheets

(51) Int. Cl.
*G06Q 10/08* (2012.01)
*G06Q 10/0832* (2023.01)
*G06Q 10/0833* (2023.01)

(56) References Cited

U.S. PATENT DOCUMENTS

2005/0242963 A1 11/2005 Oldham et al.
2009/0326861 A1* 12/2009 Langford ............ A61M 15/008
 702/173
2013/0123089 A1 5/2013 Johns et al.

OTHER PUBLICATIONS

European Search Report dated Dec. 21, 2018. 13 pages.

* cited by examiner

SYSTEM AND METHOD FOR TRACEABILITY OF TRANSPORT OF CONTAINERS OF BIOLOGICAL SAMPLES

CROSS-REFERENCE TO RELATED APPLICATIONS

This application is a 371 National Stage of International Application No. PCT/IB2018/057973, filed Oct. 15, 2018, which claims priority to Italian Patent Application No. 102017000116211 filed Oct. 16, 2017. The disclosure of each of the above applications is incorporated herein by reference in its entirety.

FIELD OF THE INVENTION

The present invention relates to a system and a method for traceability of transport of containers of biological samples, such as test tubes for biological samples or cassettes and slides for anatomical pathology. In the following description reference will be made, for brevity, to the transport of containers of biological samples from one drawing point to one analysis point, although what is described herein can be applied to any number of drawing points and analysis points.

In the following description reference will be made, for brevity, to test tubes typically able to contain blood, while it must be understood that the present invention is of general application with respect to any containers of biological samples to be transported from a drawing point to an analysis point.

PRIOR ART

In general, the transport of biological samples is done by using three separate containers, a primary container, which is to contain a single biological sample and is normally of a liquid-tight type, a secondary container, able to receive one or more primary containers and which also normally is liquid-tight, and finally a tertiary container, which is for protecting one or more secondary containers during transport.

The transport process of containers of biological samples (provided with one or more of the above indicated containers) typically comprises three macro-steps, that is a "preparation step" of the containers which are used for transport at the drawing point, a "transport step" from the drawing point to the analysis point and a "check-in step" of the containers at the analysis point, these steps being described by way of example in greater detail in the following. In the "preparation step" the biological samples, already provided with their respective primary container, are housed in batches inside a secondary container, typically made of a rigid plastic material. This secondary container enables the primary containers to be grouped and creates conditions for obtaining a transport suitably adapted to the characteristics of the biological samples to be transported. Further, the secondary containers can be sealed and housed, singularly or in batches, inside a tertiary container. In the "transport step" the secondary containers or the tertiary containers are subsequently moved by a transport operator from the drawing point, or housing point, to the analysis point, typically an analysis laboratory. The above-mentioned drawing points and analysis points, even if in multiple number, may be located inside the same structure, or, typically, in separate structures, even located at a remote distance from each other. Finally, in the "check-in step" the transport operator provides secondary containers and/or tertiary containers to operators at the analysis point, which check the received biological samples, singularly or in batches, i.e. by scanning a bi-dimensional code (typically a bar code) with which each primary container is provided.

The critical points of the transport process are many, but it is important herein to stress that approximately the 3% of the biological samples as prepared at the drawing point do not reach the analysis point, with great detrimental impacts on the health of patients and a resulting increase of the costs which must be afforded for the above-mentioned analysis operations.

A further problem relates to the turnover of the employed transport operators, to whom the chain of custody of the transported biological samples is delegated, which often involves a lack of traceability of the chain of custody. This problem is particularly relevant in case of samples which have to undergo a toxicological analysis, for which it is essential to ensure a maximum control against any break-in or manipulation of the containers content.

Finally, not less important are the transport conditions, which may affect the deterioration of the biological sample to an extent such that it can no longer be used when it arrives at destination at the analysis point. In particular, the most relevant parameters to be monitored during the transport are: time, which has a proportionally negative impact on coagulation tests; temperature, which negatively affects most of the tests when it is outside a predetermined range of temperatures; accelerations, which have a proportionally negative impact on coagulation tests; the position of the biological sample, which may have a negative impact above all in case of transport of biological samples contained inside centrifuged sample tubes; and finally exposure to light, which negatively affects most of the tests when it is outside a predetermined range of exposure.

The above indicated problems become particularly relevant with an increase of the volume of the biological samples collected at the drawing points and subsequently prepared for transport. The increase of volume actually contributes to a significant intrinsic increase of the errors to which the various actors of the transport process are subjected.

Finally, a further problem relates to the transport of wrong containers of biological samples, for example because they are empty or because they do not contain sufficient material to enable the prescribed analyses at the analysis point. Nowadays, these empty or insufficiently filled containers cause approximately the 20% of the errors in the analysis step (in particular in the case of use of laboratory automations), thus having a relevant impact in economical and social terms.

Therefore it would be desirable to have a system for traceability of transport of containers of biological samples which is able to minimize the above-mentioned drawbacks. In particular, it would be desirable to have a system for traceability of transport of containers of biological samples which is able to optimize the transport process of the above-mentioned biological samples.

Further it would be desirable to have a system for traceability of transport of containers of biological samples which is able to maintain traceability of the aforesaid biological samples in all the steps of the transport process, thus minimizing any manual interaction of the operators and the costs associated to this process.

US 2005/242963 A1 discloses an apparatus for associating information between a carrier and at least one sample of biological reagent, in particular by means of a RFID tag.

US 2013/123089 A1 discloses a laboratory centrifuge provided with a module for measuring the weight of the material loaded into the centrifuge.

U.S. Pat. No. 6,455,002 B1 discloses a workstation with a device for supplying racks of test tubes comprising a weight scale in which the weight of the single test tubes is determined through a process in which the support of the sample tube is weighed before and after removal of each sample tube and in which the difference between the two weigh values is determined.

U.S. Pat. No. 5,098,663 A discloses a rack for test tubes provided with suitable predefined housings for accommodating the above-mentioned test tubes according to a matrix.

OBJECT OF THE INVENTION

The object of the present invention is to provide a system for traceability of transport of containers of biological samples which is able to minimize the above-mentioned problems.

Also an object of the present invention is to provide a system for traceability of transport of containers of biological samples which is able to ensure the integrity of the content and if necessary also to enable specific detection of the extracted or removed content.

SUMMARY OF THE INVENTION

The above-mentioned objects are achieved by a system and a method for traceability of transport of containers of biological samples in accordance with the appended claims.

DETAILED DESCRIPTION OF EMBODIMENTS OF THE INVENTION

Further features and advantages of the present invention will become apparent from the following description of preferred embodiments, given purely by way of non-limiting example, with reference to the annexed drawings, in which.

Figure 1:
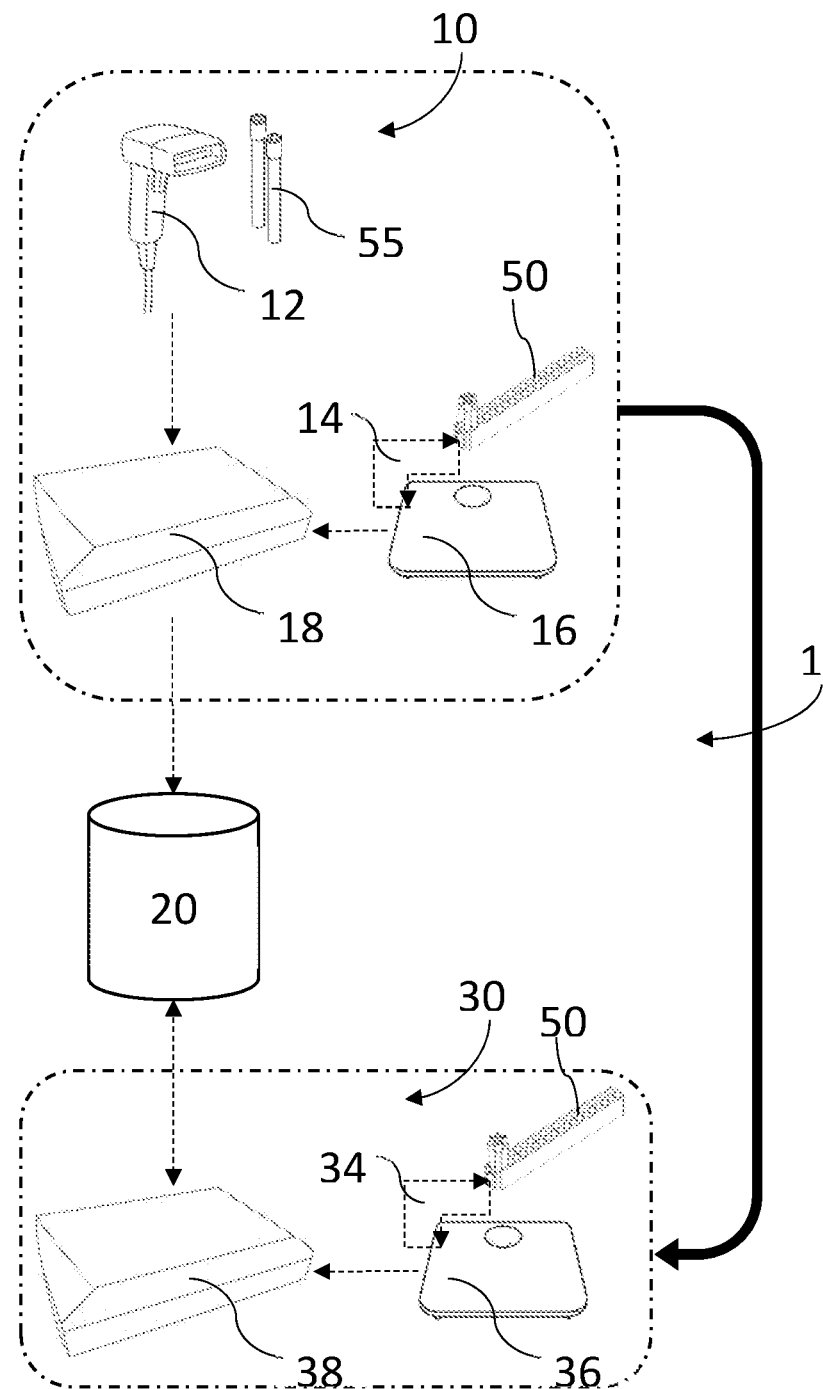
FIG. 1 is a block diagram of a first embodiment of the system for traceability of transport of biological samples, according to the present invention.

With reference to FIG. 1, a first embodiment is shown of a system 1 for traceability of transport of containers 55 of biological samples, in particular test tubes for collecting blood, in accordance with the present invention. In particular, in the above-mentioned embodiment reference will be made to the transport of the containers 55 of biological samples by means of suitable containment racks 50, able to group and contain the containers 55 of biological samples during the transport step. In the embodiment shown herein, the containment rack 50 is preferably a container provided with a plurality of housings which are dimensioned so that they can each contain a single container 55 of biological material, in particular a test tube, this rack being a secondary container which is not of a type able to be sealingly closed. According to further embodiments, this containment rack might be instead integral or optional part of a secondary container and/or might house containers of biological samples having different forms, such as cassettes and slides for anatomical pathology or urine containers.

By way of example, FIG. 1 shows the traceability system 1 according to the present invention, able to connect a single drawing point, such as a sampling room, with a single analysis point, such as an analysis laboratory. At the drawing point there is provided an apparatus 10 for preparation of the containers 55 of biological samples and/or of the containment racks 50, while at the analysis point there is provided an apparatus 30 for checking-in the containers 55 of biological samples and/or of the containment racks 50. The two apparatuses are operatively connected to each other by means of a centralized database 20 on which both the preparation apparatus 10 and the check-in apparatus 30 can operate. This example does not exclude that the traceability system may be provided with a plurality of preparation apparatuses and/or a plurality of check-in apparatuses which are operatively connected to the same centralized database, even if the above-mentioned pluralities of apparatuses were arranged at different locations which are remote from each other.

Figure 4:
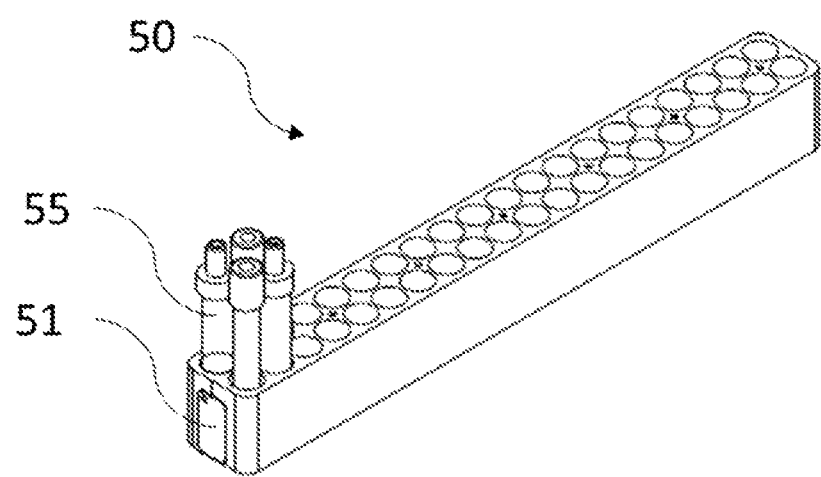
FIG. 4 is a perspective view of a containment rack provided with a plurality of containers of biological samples, according to the present invention.

Each container 55 of biological sample can be identified by means of a univocal identifier, typically a bidimensional type code (such as a bar code) printed or otherwise associated to the surface of the container. In the same manner, each containment rack 50 can be identified by means of a univocal identifier which in the present embodiment is defined by a passive RFID tag 51 embedded within the structure of the rack 50 itself, as shown in FIG. 4. Further embodiments, which are not illustrated herein, may provide for the use of different univocal identifiers, for example the containment rack could be provided also with a bidimensional code, while the container of biological sample could be provided with a passive RFID tag.

With reference to FIG. 1, at the drawing point, i.e. at the starting point of the containers 55 of biological samples, provided with their associated containment rack 50, the preparation apparatus 10 comprises a plurality of components which enable a step of preparation of the biological sample containers 55 and/or of containment racks 50 to be made and completed, this step being also called "check-out" step from the drawing point. In particular, in the embodiment illustrated herein, the preparation apparatus 10 comprises three elements which are operatively connected to each other by means of a first control device 18, such as a computer or tablet, able to host a software application which integrates logics relative to the above-mentioned preparation step and provided with a graphical user interface (GUI) as an assistant to carry out the operations provided in the aforesaid step (not shown). In particular, in the embodiment illustrated in FIG. 1, the software application is responsible for guiding the operator during the process of collection of the biological sample containers 55 within one or more containment racks 50 in preparation for the following transport step, as described later in greater detail. The first control device could also be integral part of one of the elements constituting the preparation apparatus 10.

A first device for identification of containers of biological samples constitutes one of the elements of the preparation apparatus 10 and is defined, in the first embodiment, by a bar code reader 12 with which the containers 55 of biological material are provided. Different devices may be used depending upon the type of univocal code to be identified which is provided for the containers of biological material. In case a single identification of single containers 55 of biological material is not carried out, according to different embodiments this device 12 for identification of containers of biological samples might be not present or might be not a part of the system.

The preparation apparatus 10 also comprises a first device 14 for identification of containment racks and a first device 16 for measuring the mass of containment racks. In the first embodiment of FIG. 1, the aforesaid devices 14 and 16 are grouped within a single element, that is a smart weight scale provided for identifying the containment racks 50 and taking the measurement of mass thereof and, eventually or indirectly, taking the measurement of the mass of the single containers 55 of biological samples. The aforesaid weight-scale, constituting the mass measurement device 16, is provided with an RFID tag reader able to be interfaced with and read the information contained within the passive RFID tags 51 embedded within each structure of the containment racks 50, this RFID tag reader thus defining the device 14 for identifying the containment racks. In particular, in the preferred embodiment, the device 14 for identifying the containment racks is realized by means of a unidirectional antenna arranged inside the weight scale 16 and able to define the above-mentioned RFID tag reader. In this manner, the identification of the containment rack 50 to be associated to the mass measurement device 16 is carried out in a timely manner and if, and only if, the identified containment rack 50 is arranged on the weight scale 16 itself, i.e. the containment rack 50 from which the mass measurements must be taken is surely the same containment rack 50 associated to the weight scale 16 which must take these measurements.

The group of devices associated to the smart weight scale is thus able to detect whether a test tube, identified by means of the first identification device 12, has been inserted into or removed from the containment rack 50, the rack being identified and measured by the group of devices 14 and 16. Also, the group of devices associated to the smart weight scale is able to infer the weight or the volume of a single test tube, or of a container 55 of biological material, by detecting the difference in weight of the containment rack 50 downstream of the insertion of the above-mentioned test tube. In particular, this inferred weight or volume of a single test tube can be defined with the aid of a suitable database able to store data which are necessary for the above-mentioned inference, as described in greater detail in the following discussion concerning the centralized database 20 according to the present invention.

Furthermore, this group of devices is able to measure the mass (or the weight) of the containment rack 50 provided with its content when this containment rack 50 is coming out from the drawing point, as described in detail in the following. The smart weight scale can be further provided with an inclination sensor to check that it is correctly positioned on the support surface where it lies during the operations.

The first device 12 for identifying the containers of biological samples, the first device 14 for identifying the containment racks and the first device 16 for measuring the mass of containment racks are operatively connected to the control device 18 by means of cable connections, such as of the USB type. Different connections, also of the wireless type, may be provided.

The aforesaid devices, shown in FIG. 1 as partially separated elements, might be entirely or partly grouped with each other or completely separated from each other without modifying the inventive concept of the present invention. Furthermore, the preparation apparatus might have no device for identifying the containers of biological material in the case in which the preparation step only involves operating on the containment rack.

At the analysis point, i.e. at the point of arrival of the containers 55 of biological samples with their associated containment rack 50, the check-in apparatus 30 comprises a plurality of components which enable the step of acceptance of the containers 55 of biological material and/or of the containment racks 50 to be carried out and completed, this step being also called "check-in" step at the analysis point. In particular, the check-in apparatus 30 comprises, in the embodiment illustrated herein, at least two elements which are operatively connected to each other by means of a control device 38, which also in this case is defined for example by a computer or tablet, able to host a software application which integrates logics relating to the above-mentioned check-in step and provided with a graphical user interface (GUI) as an auxiliary instrument (not shown) for the operations provided in the aforesaid step. In particular, in the embodiment shown in FIG. 1, the software application is responsible for guiding the operator during the process of receiving the containers 55 of biological samples within one or more containment racks 50 and for the acceptance or refusal of the rack 50 or container 55 themselves.

The check-in apparatus 30 comprises a second device 34 for identifying the containment racks and a second device 36 for measuring the mass of the containment racks. Also in this check-in apparatus 30 the above-mentioned devices 34 and 36 are grouped within a single element, that is a smart weight scale provided for identifying and taking the measurement of the mass of the containment racks 50 and, eventually or indirectly, taking the measurement of the mass of the single containers 55 of biological samples. The aforesaid weight scale, constituting the mass measurement device 36, is provided with an RFID tag reader able to be interfaced with, and to read the information contained within, the passive RFID tags 51 embedded within each structure of the containment racks 50, this RFID tag reader thus defining the device 34 for identifying the containment racks. In particular, in the preferred embodiment, the device 34 for identifying the containment racks is made, also in this check-in apparatus 30, by a unidirectional antenna arranged within the weight scale 36 and able to define the above-mentioned RFID tag reader. In this manner, the identification of the containment rack 50 to be associated to the mass measurement device 36 is carried out in a timely manner and if, and only if, the identified containment rack 50 is arranged on the weight scale 36 itself, i.e. if the containment rack 50 from which the mass measurements must be taken is surely the same containment rack 50 associated to the weight scale 36 which must take these measurements.

The group of devices related to the smart weight scale is therefore able to measure the mass (or the weight) of the containment rack 50 provided with its own content when this containment rack 50 is coming into the analysis point, as described in detail in the following. As described in the foregoing, the smart weight scale can be further provided with an inclination sensor to ensure that it is correctly positioned on the support surface where it lies during the operations.

Also if not illustrated in FIG. 1, the system 1 relating to the first embodiment may comprise, also at the analysis points, i.e. as a part of the check-in apparatus 30, a second device for identifying the containers of biological samples, such as a bar code reader, as illustrated for the preparation apparatus 10. In this case, the group of devices of the check-in apparatus 30 would be also able to detect whether, during transport, a test tube, as identified by means of the first identification device 12, has been removed from the containment rack 50, which is identified and measured by the group of devices 14 and 16.

The second identification device 34 of containment racks and the second device 36 for measuring the mass of containment racks, and if necessary the second device for identifying the containers of biological samples, are operatively connected to the control device 38 by means of cable connections, such as of the USB type. Also for this check-in apparatus 30, different connections, also of the wireless type, might be provided.

As described in the foregoing for the preparation apparatus, the devices defining the check-in apparatus might be totally or in part grouped with each other or completely separated from each other without modifying the inventive concept of the present invention. Furthermore, the preparation apparatus might have no device for identifying the containers of biological material in the case in which the check-in step involves only a checking of the containment racks.

The system 1 for traceability of transport of containers 55 of biological samples arranged within a containment rack 50 is finally completed by a centralized database 20 operatively connected both to the preparation apparatus 10 and to the check-in apparatus 30. This centralized database 20 is realized, for example, by a computer provided with a database and connected through the web to the above-mentioned preparation apparatus 10 and check-in apparatus 30. The centralized database 20 is thus able to constitute a centralized archive of data measured and detected in the respective apparatuses 10 and 30 to which it is operatively connected, in particular of data relating to the containers 55 of the biological samples and to the containment racks 50, whereby this data can also be later retrieved, if necessary, for traceability operations. Furthermore, the above-mentioned database 20 can be used to store settings of any type and relating to the system, as described in greater detail in the following. For example, the centralized database 20 can comprise, in one portion thereof or by means of an archive of containers which is operatively connected thereto, the mass values relating to the weight tare and if necessary the filling volume of one or more types of containers 55 of biological samples. The above-mentioned tare and filling volume values can be manually inputted before operating the traceability system 1, and can be updated manually or automatically also during operation of the above-mentioned system 1. With reference to the first embodiment shown in FIG. 1, the operation of the traceability system 1 is described in the following, by illustrating the entire transport process, which defines also a method for traceability of transport of containers 55 of biological samples arranged within the containment rack 50 from a drawing point to an analysis point, which will be further described in the following.

In the "drawing step", at the drawing points the operators on-the-field proceed as usual with the drawing of the necessary biological samples from the patient. These samples are arranged within suitable containers 55 of biological samples, which typically constitute the primary container of the biological samples themselves. This "drawing step" does not constitute part of the process implemented by means of the traceability system 1 shown in FIG. 1, but constitutes the starting step from which the subsequent operations follow.

The traceability system 1 according to the present invention thus involves the presence of the preparation apparatus 10 arranged at the drawing point to enable the preparation of the containers 55 of biological samples or of the associated containment racks 50. In this "preparation step" the biological samples provided with the respective container 55 must be housed within a containment rack 50, dedicated to their grouping, which is properly identified. The containment rack 50 must be further coupled with the first device 16 for measuring the mass of the containment racks.

In this regard, for the purpose of enabling the preparation apparatus 10 to communicate with the first mass measurement device 16, i.e. the weight scale, such device 16 is firstly associated with the first control device 18, preferably by a bidirectional coupling through a cable, such as of the USB type. The containment rack 50 to be identified is then positioned on the weight scale 16 in order to fulfill the double function of identification and measurement of the mass.

This rack 50 may have been filled already with the associated containers 55 of biological samples to be transported or, on the contrary, it may be awaiting to be filled. In the following, it is assumed that the containment rack 50 is operatively connected to the traceability system 1, i.e. to the preparation apparatus 10, when it is not yet provided with the containers 55 which is able to host. Therefore, the containment rack 50 is identified by means of the first containment racks identification device 14. This identification is made by reading the univocal identifying code associated to the passive RFID tag 51 embedded within the structure of the rack 50 itself by means of the unidirectional antenna constituting the first containment racks identification device 14. The unidirectional antenna enables a precise identification only when the containment rack 50 is phisically coupled with the weight scale 16, i.e. when it is arranged on it. This identification is maintained until when the containment rack 50 is removed from the weight scale 16 or until the end of the operations ordered by the operator.

The identified containment rack 50 is thus operatively coupled to the first mass measurement device 16 arranged at the drawing point. In this case the association between the containment rack 50 and the weight scale 16 is ensured by the arrangement of the unidirectional antenna within the weight scale 16 itself, which is preliminarily identified by the first control device 18.

When the identification and association of the containment rack 50 with the weight scale 16 has been completed, the operator may proceed with the identification of the containers 55 of biological samples and their association to the rack 50 itself.

The container 55 of biological samples, preliminarily filled with the biological samples of a predetermined patient and provided with its own univocal identifier, such as a barcode constituting a univocal identifier of said container 55, is identified by means of the first device 12 for identifying the containers of biological samples, arranged at said drawing point and also operatively connected to the first control device 18.

Thus, the operator inserts the identified container 55 of biological samples into one of the empty housings of the identified containment rack 50.

Even if a physical coupling has taken place, it is necessary to ensure traceability between container 55 and rack 50 as well as to maintain this traceability also in the subsequent steps. In this regard, in the following step a measurement of the mass of the containment rack 50 with the container 55 of biological samples inserted therein is taken, by means of the first mass measurement device 16. In particular, the preparation apparatus 10, downstream of the identification of rack 50 and container 55, remains awaiting for a proper pairing before enabling further container-rack associations. According to the present invention, therefore, the pairing of the identified container 55 of biological sample with the identified containment rack 50 is made when the above-mentioned first device 16 for measuring the mass of containment racks detects a variation of the measurement of the mass of the identified containment rack 50, with respect to its previous configuration, without containers 55.

If a mass variation is detected, the preparation apparatus 10 proceeds with defining, and storing in the centralized database 20, the pairing between the identified container 55 and the identified rack 50. In particular, the pairing is stored in the centralized database 20 by correlating the univocal identifier of the above-mentioned identified container 55 of biological sample and the univocal identifier of the above-mentioned identified containment rack 50.

The above-mentioned mass variation can be detected by an absolute measurement or as a relative measurement with respect to one or more predetermined threshold values. For example, the above-mentioned threshold values can be stored within the first control device 18 depending upon the type of container 55 of biological samples to be paired, and then to be indirectly measured. In one alternative embodiment, the threshold values can be stored in the centralized database 20 and, then, retrieved by the preparation apparatus 10 in the step of evaluation of the variation of the detected mass. The threshold value may be related for example to the weight of an empty container 55 for biological samples, depending upon the type of identified container, or to the weight of the container 55 including a minimum quantity of biological sample necessary in the following analysis steps. By means of the threshold value it is therefore possible to ensure an actual coupling of the container 55 to the rack 50 or, if necessary, to ensure the actual coupling of a container 55 with a sufficient content to the above-mentioned rack 50, thus minimizing errors in the analysis step.

The identified container 55 of biological samples may be comprised within one of the container types stored within the containers archive, i.e. one of the container types for which the tare and eventually the filling volume are known. In this case, the tare and/or the expected filling volume or, also, the calculated mass deriving from the sum of the two values (tare plus mass inferred from the expected filling volume, on the basis of the specific weight of the biological sample to be contained) could constitute one or more threshold values to be used for the system 1 according to the present invention.

In the case of measurement of the mass variation with respect to the predetermined threshold value, the preparation apparatus 10 is able to define the pairing between the univocal identifier of the containers 55 of biological sample and the univocal identifier of the containment racks 50 when the mass variation of the identified containment rack 50 exceeds the above-mentioned predetermined threshold value.

Furthermore, the preparation apparatus 10 can store in said centralized database 20 the variations of mass measurement detected during the pairing step between the univocal identifier of the containers 55 of biological sample and the univocal identifier of the containment rack 50. In this manner, the measurement of the mass variation of the containment rack 50, when provided with the container 55, enables an indirect measurement to be established of the mass of the container 55 itself, which can be used in the subsequent analysis steps, for example during the step of centrifugation of the biological sample.

Furthermore, in the case in which the centralized database 20 were provided with the archive of containers so that it can define one or more threshold values relating to the mass of the tare of the container 55 and/or the mass of the tare and of the expected filling volume (from which the mass of the expected biological sample is inferred), the preparation apparatus 10 can store within the centralized database 20 the discrepancy with respect to the prescribed threshold value or, if this is the case, it can issue an alert signal if the detected mass measurement is lower than one or more of the above-mentioned threshold values. In case of an alert signal, the preparation apparatus 10 can store the kind of alert which has been generated for the identified container 55 and, if necessary, it can prevent any subsequent operation until when a container 55 having a mass equal or greater than the threshold value(s) is inserted.

The above-mentioned identification steps of the container 55 of biological samples and pairing of the associated identifier with the identifier of the containment rack 50 able to host it are repeated for each container 55 until the containment rack 50 itself is completely filled, until the containers 55 to be prepared are exhausted or until the operations ordered by the operator are completed. Therefore, in case of a multiple filling of the containment rack 50, the traceability system 1, in particular the preparation apparatus 10, is able to ensure that the subsequent coupling and the associated steps described in the foregoing, can be carried out only when the pairing has been completed, when the weight scale 16 has recorded a mass variation and the preparation apparatus 10 has defined and stored the proper pairing. This enables the traceability of the proper identified containers 55 to be ensured, thus avoiding that the identification and pairing steps are not correlated with each other. Furthermore, the traceability system 1, by means of said preparation apparatus 10, enables constant monitoring of the mass of the containment rack 50, thereby identifying any undesired removal of previously identified and paired containers 55 of biological samples, which would jeopardize the integrity of the system. For example, in the case in which a container 55 were removed, either inadvertently or intentionally, the preparation apparatus 10 is able to record the measured mass variation, which will result to be negative, thus storing and/or issuing an alert if necessary into the centralized database 20 or blocking any subsequent operation in the preparation step. Furthermore, the traceability of the containers 55 with respect to the used containment rack 50 is made by using a minimum number of components of reduced cost and with reduced time consumption. In particular, a single mass measurement device is used for evaluating the pairing between containers 55 and rack 50 to indirectly identify the mass of each container 55 and to directly identify, as described in the following in greater detail, the mass of the containment rack 50. Furthermore, the mass measurement device can be used for a plurality of containment racks 50, simply requiring the proper coupling with the following rack at the end of the operations with the previously used rack.

At the end of loading and pairing of all the containers 55 of biological samples into the containment rack 50 the subsequent steps are started for the proper traceability of the rack 50 itself, according to the present invention. The containment rack 50 might also arrive at the preparation apparatus 10 already provided with respective containers 55 of biological samples, so that the steps described in the foregoing would not have to be carried out. On the contrary, the steps described in the following in detail are to be carried out in any case, that is also in case the rack 50 is already provided with the associated containers 55.

The identified containment rack 50 provided with the containers 55 is also defined as "outgoing rack", thus meaning the rack which is ready to be moved away from the preparation apparatus 10. The mass of the outgoing containment rack 50, that is provided with the containers 55, is therefore measured by said first mass measurement device 16 with which the rack 50 is coupled, thereby defining the "outgoing mass" of said containment rack 50. The preparation apparatus 10 goes on with storing the above-mentioned outgoing mass in the centralized database 20, and carrying out the operations which are required to ensure the following traceability of the rack 50. In this manner, the traceability system 1 is able to obtain at any time the information relating to the mass measurement of the containment rack 50 provided with its containers 55 of biological materials and arranged at the output from the drawing point. The above-mentioned steps are repeated for each containment rack 50 at the output from said drawing point, that is the preparation apparatus 10 is able, for each outgoing containment rack 50, to provide the step of identification of the containment rack 50, of detection of the measurement of the outgoing mass of said containment rack 50 and of storing in the centralized database 20 of the measurement of the outgoing mass of the containment rack 50.

Once the previous steps have been properly defined, the containment racks 50 are sent to the "transport step", if necessary within suitable secondary containers or containers of a different kind, into which they are moved by an operator attending to the transport from the drawing point, or from the accommodation point, to the analysis point, which is typically an analysis laboratory. The above-mentioned drawing point and analysis point, even if in multiple number, may be located within the same structure or, typically, within separate structures located even at a remote distance from each other.

At the analysis point, the provided steps for the "check-in step" start, in particular these steps are carried out from when the transport operator supplies the containment racks 50, if necessary within suitable secondary containers or the like, to the analysis point operators.

At the analysis point there is arranged the check-in apparatus 30 which comprises, as described in the foregoing, the group of devices relating to the second device 34 for identifying containment racks and the second device 36 for measuring the mass of the above-mentioned racks, which are operatively connected to the second control device 38, and enable the check of the containment rack 50 at the input of the analysis point to be carried out. With the term "incoming rack" is meant the rack which is ready to be arranged at the check-in apparatus 30. The mass of the incoming containment rack 50, provided with containers 55, is then measured by the second device 36 for mass measurement to which the rack 50 is coupled, defining the "incoming mass" of said containment rack 50. The incoming mass thus enables the comparison to be made with the previously measured outgoing mass, maintaining the traceability of the containment rack 50 at a reduced cost and a reduced time consumption.

Even if not shown in FIG. 1, a second device for identifying containers 55 of biological samples may be provided.

In this manner, for example in the case of failed matching between the outgoing mass and the incoming mass, it is possible to carry out the traceability check among all the containers 55 of biological samples and to identify any missing or not recorded containers 55 during the preparation step.

In the following, it is assumed that the check-in apparatus 30 has been already initialized, that is a connection has been already established between the above-mentioned devices 34 and 36, i.e. the second smart weight scale, and the second control device 38, in a similar manner to what has been described in the foregoing for the preparation apparatus 10.

The check-in apparatus 30 which is awaiting to start the prescribed operations, identifies the rack 50 containing containers 55 of biological samples incoming to the analysis point, by means of the second device 34 for identifying containment racks which is arranged at the analysis point. This step corresponds to the same step described in the foregoing for the preparation apparatus 10, that is this identification is based on the recognition of the univocal identifier of the passive RFID tag 51 with which the containment rack 50 is provided.

However, a plurality of different situations may be present at the above-mentioned check-in apparatus 30: identification of an incoming containment rack coming from the previous transport step, identification of a containment rack processed in a previous step, such as for example a temporarily suspended step, and finally identification of a new not foreseen containment rack, which is not recorded in the centralized database 20 during the preparation step.

The containment rack 50 incoming to the check-in apparatus 30 is therefore operatively coupled with the second device 36 to measure the mass of containment racks, that is this rack 50 is arranged by the operator of the analysis point on the weight scale 36 thus actually obtaining the double function of identification of the containment rack 50, by means of the unidirectional antenna 34 embedded therein, and of measurement of the incoming mass of the containment rack 50. In this case, the identification of the containment rack 50 involves two steps, that is a first step of identification of the univocal identifier contained within the passive RFID tag 51, similarly to what is made by the preparation apparatus 10, as well as a second step of checking the presence of this identifier at the centralized database 20. In the following, reference will be made to the most common operations of identification of a containment rack 50 incoming to the preparation apparatus 10 and correctly recorded at the centralized database 20. Further situations will be illustrated later, by way of example.

Downstream of the identification of the containment rack 50, and the checking of its proper registration, the check-in apparatus 30 is ready to perform the measurement of the incoming mass of the above-mentioned identified containment rack 50 by means of the above-mentioned second mass measurement device 36. Once the above-mentioned measurement of the incoming mass has been taken, the traceability system 1, that is to say the preparation apparatus 30, goes on with comparing the said detected incoming mass measurement with the measurement of the outgoing mass stored within the centralized database 20, this operation being handled by the second control device 38 or, for example, by a further centralized control device (not shown) and operatively connected to the centralized database 20.

The measurement of the incoming mass of the containment rack 50 enables the traceability thereof to be maintained, by checking any alterations which may have occurred during the transport step. The comparison of the incoming mass with the outgoing mass of a same containment rack 50 enables to discriminate the subsequent operations which are to be made on the rack 50 itself by the traceability system 1. In particular, if the two mass measurements match with each other, eventually apart from a predetermined tolerance value, the traceability system 1 is able to signal the correctness of the transport steps to the operator, for example through the associated GUI, and if necessary to store the above-mentioned information within the centralized database 20.

On the contrary, in the case in which the measurement of the outgoing mass is different from the measurement of the incoming mass, the traceability system 1 generates an alert which advises the operator, for example through the associated GUI, of the missed matching between the two values. Also in this case, the above-mentioned information is stored within the centralized database 20, thereby maintaining the traceability of the containment rack 50.

Downstream of the generated alert, the operator may decide if he wishes to continue with processing the containment rack 50 anyway, or attending to a manual check of the containers carried therein or, finally, suspending the check of the above-mentioned containment rack 50 in view of resuming the process at a later step. In particular, the step of manual check of the containers 55 of biological samples may be carried out only if in the preparation step the containment rack 50 has been filled with the aid of the traceability system 1, that is if the containment rack 50 has not come to the preparation apparatus 10 already provided with the containers 55 of biological samples.

Assuming the generation of the alert by the traceability system 1 and the presence of a second device for identifying the containers of biological samples, the operator can go on, aided by the GUI, with manual identifying the containers 55 of biological samples to complete the traceability of the content and to evaluate the reason why this alert has been generated.

The traceability system 1 awaits, then, that the operator starts to remove a container 55 of biological samples and identifies it, by means of the second device for identifying the biological samples, for example by attending to the reading of the associated identifying code contained in the barcode attached to the container 55 of biological samples itself. As soon as the container 55 is identified, its univocal identifier is checked within the centralized database 20, by looking for a matching with the containment rack 50 from which it has been removed. This second identification step may lead to obtaining three different results: the identified container 55 finds a matching with respect to the association with the containment rack 50 from which it has been removed or, in the case of error status, more than one matching of containment racks are found or, finally, the identified container 55 does not find any matching within the centralized database 20.

In the first case, since the container 55 of biological samples has been correctly identified and the proper association with the containment rack 50 has been verified, the traceability system 1, that is the check-in apparatus 30, takes the configuration of wait for a new container 55 of biological samples, if necessary storing the above-mentioned information within the centralized database 20. These steps go on in the same manner until when the containers 55 of biological samples have been all removed from the associated containment rack 50, or until when one of the other two error conditions take place or until the end of the operations ordered by the operator.

If during the identification step of the container 55 of biological samples it is detected the error condition relating to the detection of a plurality of matchings with a corresponding number of containment racks, the traceability system 1, i.e. the check-in apparatus 30, proceeds with signaling this error condition to the operator, if necessary storing this information into the centralized database 20. Furthermore, the operator has to solve the signaled conflict, for example by operating on the associated GUI, indicating to which containment rack 50 the identified container 55 of biological samples is to be associated. If the conflict is solved, the traceability system 1, that is the check-in apparatus 30, is again set in a step of wait for new containers 55 of biological samples to be identified.

A more problematic error condition lies in the identification of a container 55 of biological samples which is not provided for the identified containment rack 50, i.e. not stored within the centralized database 20. In this case, the operator must operate manually on the GUI to solve the conflict or to reject the incoming containment rack 50.

The above-mentioned steps corresponding to the identification of the containers of biological samples and to the proper association with the corresponding containment rack are then repeated until when the containers of biological samples have been all removed from the same containment rack or until the end of the operations ordered by the operator.

In the same manner, in case a plurality of containment racks are received at the analysis point, the steps described in the foregoing are repeated for each incoming containment rack.

Finally, as described in the foregoing, in the above-mentioned check-in apparatus 30 a plurality of error conditions may be present which are associated to the identification of the containment rack 50. In the case of identification of incoming racks which have been already processed and temporarily suspended, the traceability system 1, that is the check-in apparatus 30, arranges itself again in a step of measurement of the mass of the rack 50 for resuming the traceability operations, from the evaluation of the measurements of the outgoing mass and the incoming mass. In the case in which, instead, the step of the identification of the containers of biological samples has been suspended, the traceability system 1, that is the check-in apparatus 30, arranges itself again in a step of identification of the above-mentioned containers 55 of biological samples, resuming the traceability operations from the check of the pairing between the suspended containment rack 50 and the containers 55 of biological samples which are still to be identified. Finally, in the case in which the error condition is related to the identification of an incoming rack which does not have a match among the outgoing racks, the operator may indicate to the traceability system 1 how to proceed, for example by accepting the incoming rack 50 anyhow or by rejecting a processing thereof. In any case, the processed information relating to the above-mentioned errors may be stored within the centralized database 20 to maintain the traceability of the containment racks 50 as well as of the containers 55 of biological samples.

Figure 2:
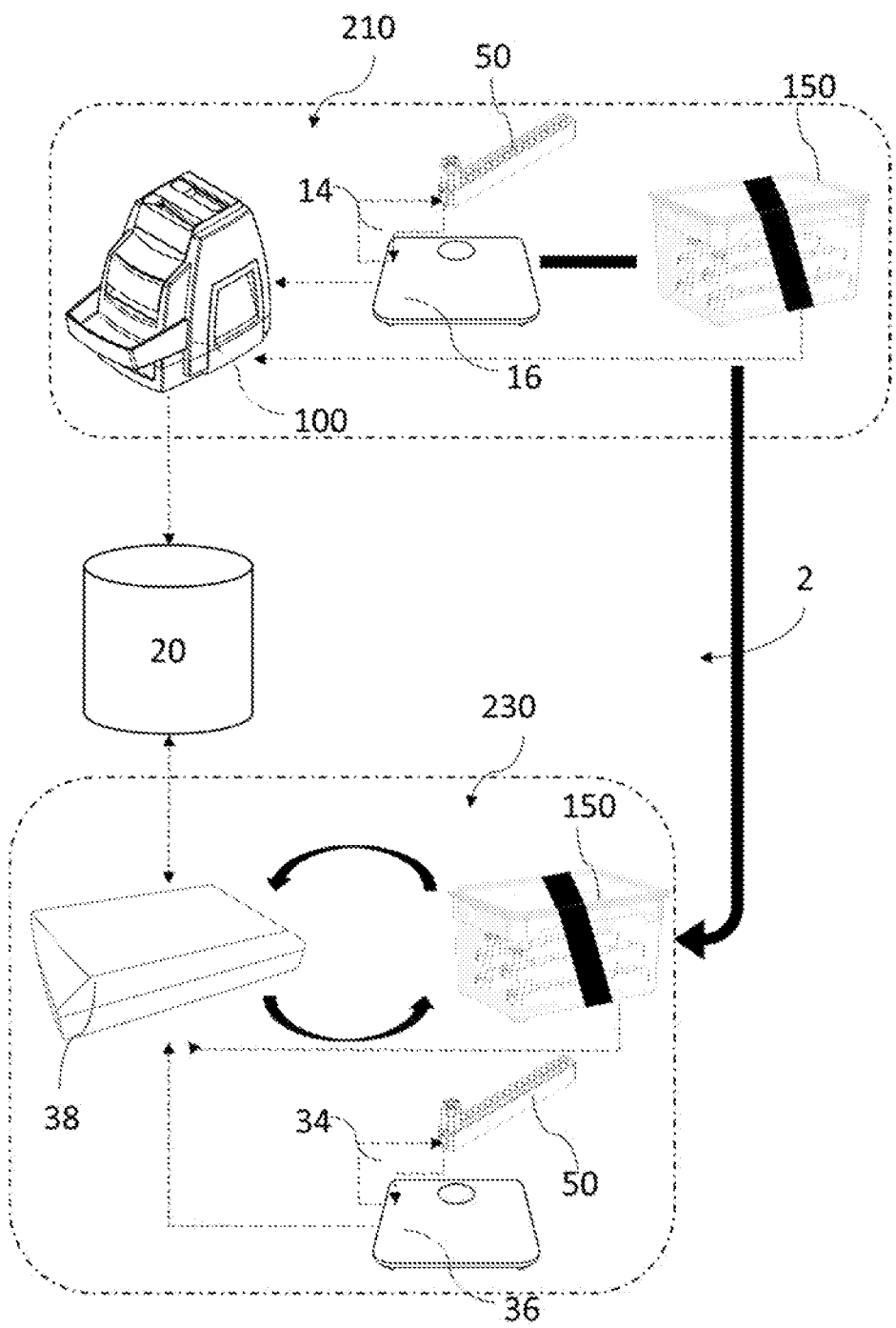
FIG. 2 is a block diagram of a second embodiment of the system for traceability of transport of biological samples, according to the present invention.

In FIG. 2 there is shown a second embodiment of the traceability system 2 according to the present invention. Differently from the previous embodiment, the traceability system 2 comprises, at the preparation apparatus 210, a labeler or apparatus 100 for identifying patients and labeling containers, similar to what has been described in European patent application EP 2 160 693 A1 and/or EP 2 805 170 A1 in the name of the Applicant. This apparatus 100 for identifying a patient and labeling containers includes both the first control device and the first device for identifying containers of biological samples provided for the preparation apparatus 210 at the drawing point. Therefore, it is the apparatus 100 which hosts the software module which includes the logic for guiding the operator during the steps of the preparation process, eventually with the aid of a graphical user interface (GUI), for example provided on a tablet or on an external display unit connected to the apparatus 100. According to this second embodiment, therefore, the "sampling step" at the drawing points becomes integral part of the traceability process according to the present invention, by ensuring the best management of the traceability of the biological samples starting from the drawing step or even from the step of identification of the patient.

The preparation apparatus 210 further comprises a first device 14 for identification of containment racks and a first device 16 for measuring the mass of containment racks, of the same kind as already described for the first embodiment. In particular, also in this case the two devices 14 and 16 can be integrated with each other by embedding an unidirectional antenna, constituting the device 14, within a weight scale, constituting the device 16.

The check-in apparatus 230 is instead equivalent to the check-in apparatus 30 described for the first embodiment of FIG. 1 and therefore will not be described further herein.

Furthermore, the traceability system 2 comprises one or more containment structures 150 each provided with a plurality of independent housings for storing the respective containment racks 50 coming out from the preparation apparatus 210. This containment structure 150 is also provided with a univocal identifier, preferably constituted by a passive RFID tag containing the above-mentioned univocal identifier and, preferably, with storing means and control means (not shown) such as an electronic board provided with a memory and a microcontroller, operatively connected to each other for storing suitable data, as described in greater detail in the following. Preferably, the above-mentioned components are integrated within a monitoring device, housed within the structure 150 itself and preferably of a removable type. This monitoring device, which may be not present in alternative embodiments (not shown), is an electronic device able to monitor and record one or more physical parameters of the environment in which the containment structure 150 is placed. To this purpose, the monitoring device comprises, preferably, an acceleration sensor, a light sensor, a humidity sensor and a temperature sensor.

The monitoring device receives inputs from the following sensors integrated in the electronic board of the device. The acceleration sensor enables monitoring and recording, within the above-mentioned storing means, the acceleration forces to which the content of the containment structure 150 is subjected: for example the monitoring device may be able to record free falls from a significant height and abrupt accelerations during the transport step and may be able to record the orientation of the containment structure 150 with respect to one or more directions. The light sensor enables monitoring and recording, within the above-mentioned storing means, the intensity of the environment light inside the containment structure 150 during the transport step. The temperature sensor enables monitoring and recording, within the above-mentioned storing means, the temperature of the environment in which the containment rack 50 is placed during the transport step. Finally, the monitoring device may be provided with a timing sensor, able to measure the duration of the transport step.

The containment structure 150 may be further inserted within a further container, for example of a liquid-tight secondary type, provided with a chamber able to house one or more of said containment structures 150 and/or of containment racks 50. The secondary container may be provided with a closure device (not shown) able to ensure the integrity of said chamber during the transport step between said drawing point and said analysis point. The closure device may include, or be operatively connected to, an integrity sensor which may be part of said secondary container or an extension of the sensors of the monitoring device itself. This integrity sensor may be made, for example, by a magnet coupled to a relay, when the container is mechanically closed, and able to detect whether the container is arranged in an open position. This integrity sensor may fulfill the double function of implying the application of a greater force for arranging the container in an open condition, thereby avoiding accidental openings, and of monitoring and storing the opening of the container itself within the storing means of the containment structure 150. Furthermore, the entire monitoring device, or part of the sensors thereof, may be arranged within said liquid-tight secondary container, eventually within the chamber able to house one or more containment structures 150 and/or containment racks 50. The above-mentioned secondary container may further include a cooling device able to maintain the temperature of the chamber within a predetermined interval of temperatures, for example a temperature range which is established or can be modified by the user. Finally, the secondary container may be provided with one or more sensors able to monitor one or more physical parameters during the transport step between said drawing point and said analysis point, or eventually also during the storing step of the containment structures 150 or of the containment racks 50 upstream or downstream of the transport step. The above-mentioned sensors may comprise, for example, a temperature sensor, able to monitor the temperature inside the chamber, and/or a position sensor, able to monitor the position of the secondary container, and/or an acceleration sensor and/or a light sensor and/or a humidity sensor.

Each container of biological samples or, preferably, each containment rack 50 of biological samples may further provide for a profile of acceptance for the parameters which are monitored by means of the above-mentioned monitoring device. A profile defines the extension of valid values for each physical parameter measured by means of the monitoring device. The above-mentioned profiles may be preliminarily stored, for example depending upon the type of biological sample which is drawn and/or the type of analysis to be made, within the first control device 18. The assignment of a profile to a specific containment rack 50 thus enables to check whether the data measured by the plurality of sensors are comprised within the acceptance values prescribed by the specific profile.

Each housing of the containment structure 150 is provided with a third identification device of the containment racks 50 operatively connected to the above-mentioned control means and able to monitor the presence of the containment racks 50 in the above-mentioned housings during the transport of the containment structure 150 from the drawing point to the analysis point. In the embodiment described herein, each third identification device is preferably made by an unidirectional antenna arranged within each housing and able to ensure a precise identification of the rack 50 arranged therein and any movement thereof.

With reference to the above-mentioned second embodiment shown in FIG. 2, the operation of the traceability system 2 is described in the following, for simplicity excluding the steps which relate, mutatis mutandis, to what has been described in the foregoing for the first embodiment of FIG. 1.

The presence of the apparatus 100 for identifying patients and labeling containers therefore fulfills the functions described in the first embodiment for the first control device 18. Therefore, for the purpose of enabling the preparation apparatus 210 to communicate with the first device 16 for mass measurement, that is the weight scale, the latter is associated to the apparatus 100. The coupling between the first device 14 for identifying containment racks and the apparatus 100 is thus made intrinsically, the unidirectional antenna 14 being embedded within the above-mentioned weight scale 16.

The containment rack 50 to be identified is therefore positioned on the weight scale 16 obtaining the double function of identification and mass measurement.

The subsequent steps of identification of the containment racks 50 and/or of the containers 55 of biological samples correspond to what has been described previously in the first embodiment, the same components being used. In particular, the step of the identification of the containers 55 is made directly by means of the apparatus 100, provided with the associated first device for identifying the containers of biological samples.

When a containment rack 50 is going out from the drawing point, and is ready for the transport step, the operator proceeds with decoupling the rack 50 itself from the associated first mass measurement device and places this rack 50 within one of the empty housings of the containment structure 150. Therefore, the latter must be preliminarily provided with the monitoring device and is able, by means of the third device for identifying racks provided in the respective housing, to associate also logically the rack 50 inserted therein, by storing this information within the storing means with which the containment structure 150 is provided. The information relating to the association between rack 50 and containment structure 150, in particular between the univocal identifier of the rack 50 and the univocal identifier of the containment structure 150, may be further stored within the centralized database 20. Furthermore, each housing could further be provided with suitable closure means to be arranged in a locking position, that is able to prevent the removal of the containment rack 50, after the insertion of the rack 50 itself. In this case, the coupling between rack 50 and containment structure 150 could be made automatically by arranging the closure means in the locking position, for example by automatically activating the unidirectional antenna with which the associated housing is provided and by proceeding with the automatic execution of the steps able to define the pairing between the rack 50 and the containment structure 150 at least at the level of the structure 150 itself, that is within the storing means with which the latter is provided.

The above-mentioned closure means can be made, for example, by means of a solenoid valve operatively connected to one or more pistons. Each piston can thus be moved between a locking position, in which it prevents the containment rack from going out of the corresponding housing of the containment structure, and a rest position, in which the containment rack is free to be disengaged from the associated housing. In this manner, by arranging a solenoid valve and the associated piston in each housing of the containment structure, it is possible to carry out the mechanical locking of the containment rack inserted therein. In the same manner, it is possible to arrange a piston in each housing and to connect all the pistons to a single solenoid valve to obtain a centralized control of the closure and opening of the housings. Finally, it is further possible to arrange a piston in common among two or more housings, by connecting each piston to a solenoid valve to obtain an individual control in batches, or by further connecting each piston to a single solenoid valve to obtain the centralized control of the partitions defined by each piston. Further embodiments and configurations of the closure means are also possible without modifying the inventive concept.

In case it is present a profile of acceptance for the outgoing rack 50, arranged within the containment structure 150, the preparation apparatus 210 can store this profile within the monitoring device, that is within the storing means of the structure 150 itself, by correlating this profile of acceptance with the univocal identifier of the identified rack 50.

Once filling of the containment structure 150 is completed or, alternatively, following a command of end of loading by the operator, the structure 150 and the associated containment racks 50 are moved out from the drawing point for the subsequent transport step. During this step, the control means of the containment structure 150 monitor the presence of the racks 50 in the respective housings and, if necessary, record an alert data if a containment rack 50 is removed from its housing. This alert can be recorded upon arrangement of the closure means into an unlocking position, if these means are provided, and/or following the interruption of communication between the unidirectional antenna provided in the housing and the passive RFID tag 51 embedded within the containment rack 50.

At the end of the transport step, the containment structure 150 is arranged at the predetermined analysis point, where the check-in steps are carried out. The operator dedicated to these steps thus proceeds with the operative coupling between the incoming containment structure 150 and the second control device 38 of the check-in apparatus 230.

As an integration to the check-in apparatus 230, the second identification device used for the containment racks 50 can be able to identify also the containment structures 150 or, alternatively, a further first device for identifying the containment structures can be provided and dedicated exclusively to identifying the above-mentioned structures 150.

The first device for identifying containment structures (for example a NFC reader) thus enables the data recorded by the monitoring device to be extracted so that they can be compared, if necessary, by means of the second control device 38, with the acceptance profile provided for the racks 50 contained in the containment structure 150. In particular, the second control device 38 checks the data relating to the integrity sensor which ensures that the rack 50 is not removed from the containment structure 150 dedicated to the transport thereof during the transport step itself.

If the data relating to the integrity sensor result to be negative, that is the control means of the containment structure 150 have not recorded any change of the locking position of the closure means and/or any removal of the containment racks 50 from the respective housings (that is any logical decoupling from the unidirectional antenna), it is possible to proceed with a quick check-in step. This step leaves the operator free from inspecting each containment rack 50 and/or each container 55 of biological samples manually. Therefore, the quick check-in step would enable the input into the analysis point while minimizing the required operations, and therefore reducing time and costs for the traceability of the transport.

On the contrary, if the data relating to the integrity sensor are positive, that is the control means of the containment structure 150 have recorded an unlocking position of the closure means and/or a removal of the containment racks 50 from the respective housing (that is the logical decoupling from the unidirectional antenna) it is not possible to operate according to a quick check-in step. In this case, the check-in apparatus 230 activates the second device 36 for measuring the mass of containment racks since the containment structure 150, identified by means of the first device for identifying containment structures, has detected alert data of the removal of the above-mentioned racks and/or data informing of an unlocking of the closure means, said data being stored during the transport step, within the respective storing means of the containment structure 150. Thus it will be necessary to proceed with the check-in step at an earlier time by checking the measurements of the outgoing mass and the incoming mass for each containment rack 50 according to what has been described in the first embodiment. Finally, in case of missed matching between the two above-mentioned mass measurements, the manual identification of the containers 55 of biological samples might be necessary, where possible, according to what has been described in the first embodiment.

In an alternative embodiment (not shown) the traceability system might not have any containment structure, although comprising the apparatus for identifying patients and labeling containers.

Furthermore, in a further alternative embodiment (not shown), the traceability system might be made according to the first embodiment shown in FIG. 1 and be also provided with the above-mentioned containment structure to maintain the traceability of the containers 55 and if necessary of the physical parameters monitored within said containment structure 150.

Figure 3:
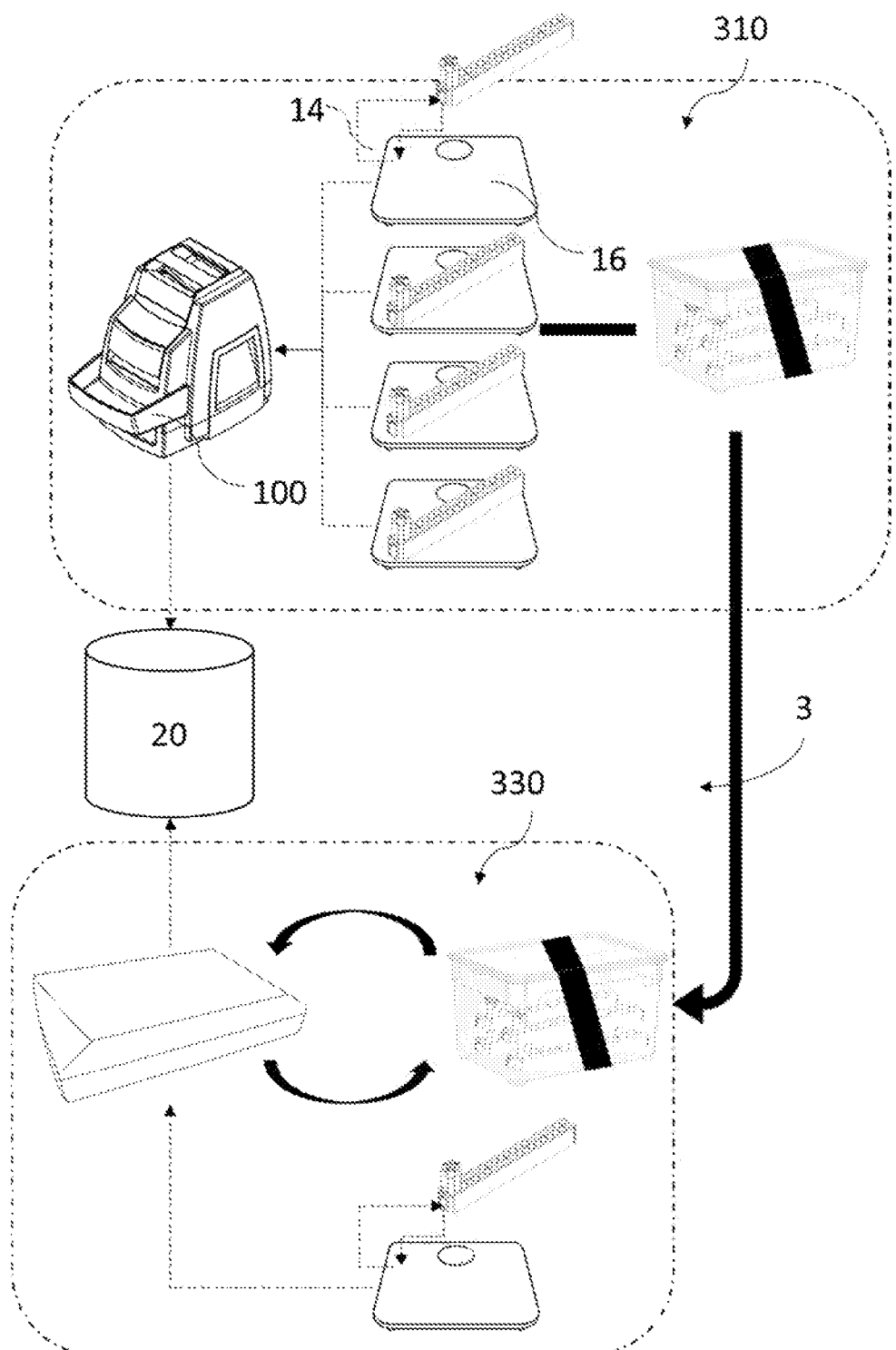
FIG. 3 is a block diagram of a third embodiment of the system for traceability of transport of biological samples, according to the present invention.

In FIG. 3, there is shown a third embodiment of the traceability system 3 according to the present invention. This embodiment is similar to the second embodiment of FIG. 2, but has the possibility to associate a plurality of first devices for identifying the containment racks and a plurality of corresponding first devices for measuring the mass of containment racks to a single control device. In particular, the preparation apparatus 310 comprises four weight scales 16 each respectively provided with the antenna 14 for identifying the containment rack 50 coupled therein, according to the configuration already described in the foregoing. In this manner, it is possible to have the operations of preparation in each containment rack 50 in parallel with the management by one or more operators simultaneously.

The steps to be carried out for the preparation and acceptance of the containers 55 of biological samples and/or containment racks 50 are not further described since they correspond, mutatis mutandis, to the steps already described for the previous embodiments. It is clearly apparent that this embodiment enables a relevant saving in the costs associated to the number of components which are used, since a plurality of weight scales 16 and corresponding devices 14 for identifying containment racks, are simultaneously operatively connected to the preparation apparatus 310 by means of a single apparatus 100 for identifying patients and labeling containers (or alternatively by means of a single first control device, not shown).

This third embodiment enables, with respect to the embodiments described in the foregoing, to operate a preliminary sorting of the containers 55 of biological samples, identified by the first device for identifying the containers of biological samples that is by the apparatus 100 for identifying patients and labeling containers, in one or more containment racks 50 identified by the first device 14 for identifying the containment racks, for example according to the type of biological sample to be handled and/or to the type of analysis to be carried out. In particular the control device, not shown herein by way of the example since it is integrated in the apparatus 100 for identifying patients and labeling containers which has been described in the foregoing, is able to host the software application which integrates the logic related to the check-in step. For example the graphical user interface (GUI), which can be an aid for carrying out the operations provided in the above-mentioned step, can enable, following the identification of the containment racks 50 and of each container 55 of biological samples, the indication of the proper arrangement and the proper rack-container association. Therefore, the operator can be guided in the indication of the type of rack 50 to be filled with the associated container 55 and this association is ensured by the detection of the mass variation by the mass measurement device 16 associated to the indicated rack 50. Therefore, in case of a coupling error, such as the insertion of a container 55 into a rack 50 which is different from that indicated, the missing mass change on the first mass measurement device 16 related to the indicated rack 50 or the mass change on a different first mass measurement device 16 can generate an alert for the operator, which for example becomes visible through the GUI, and even prevent further operations to be carried out until when the rack-container coupling has been corrected.

In one alternative embodiment (not shown) the traceability system could have no containment structure and/or no apparatus for identifying patients and labeling containers, although comprising a plurality of devices for identifying the containment racks and of the associated devices for measurement of the mass of the containment racks and at least one device for identifying the containers of biological samples.

The above-mentioned embodiments can be further integrated with the use of a secondary container, preferably of the liquid-tight type, provided with at least one chamber able to accommodate one or more containment structures 150 and/or containment racks 50, as described in greater detail in the foregoing. In this case, before starting the transport step for moving between the drawing point and the analysis point, it is necessary to define the step of insertion of the containment structure 150 and/or of the containment racks 50 into the above-mentioned chamber. Within this chamber an operating temperature is thus defined and maintained within a predetermined temperature range, defined according to the type of samples to be moved and preferably to be kept as much narrow as possible. In particular, this temperature must be kept within the above-mentioned predetermined range during the entire transport step, preferably from the moment when the chamber is closed until the chamber is opened again at the analysis point. The secondary container may also ensure the integrity of the chamber during the above-mentioned transport step, preventing access by non-authorized persons and/or during non-authorized steps and/or it can record an alert signal or emit an alert signal in case of undue access.

Finally, although the containment rack has been described as a device outside the traceability system, it could also be integral part of it, without modifying the inventive concept according to the present invention.

According to a further embodiment, not shown, the traceability system according to the present invention may have no centralized database although maintaining all the features contained in the embodiments described in the foregoing, also in combination with each other.

In particular, the traceability system of the transport of the containers of biological samples arranged within a containment rack from a drawing point to an analysis point, in which each container of a biological sample and each containment rack is provided with a univocal identifier, can comprise at least one preparation apparatus arranged at the drawing point and comprising a first device for identifying containment racks and a first device for measuring the mass of containment racks; at least one check-in apparatus arranged at the analysis point and comprising a second identification device for identifying containment racks and a second device for measuring the mass of containment racks.

Each containment rack can thus be provided with suitable storing means, preferably of the non-volatile type, within which information and/or data relating to the containment rack and/or the containers of biological samples housed therein can be stored, as described in the foregoing in the embodiments provided with the centralized database. Preferably, the above-mentioned means for storing the containment rack are made by a solid-state device or by an RFID, of the passive or active type, provided with suitable storing space. The above-mentioned storing means can be embedded within the structure of the containment rack or, in the same manner, can be engaged or disengaged from a suitable housing thereof.

The traceability system may also comprise anyway even the above-mentioned centralized database, whose use can be limited, for example, to storing the above-mentioned data and/or information as a backup device or to storing data and/or inherent information to be used on a multiple number of racks, such as for instance the threshold values which have been described in the foregoing or the inference of the quantity of liquid as detected for each container.

The preparation apparatus is able, for each containment rack outgoing from the drawing point, to identify the containment rack by means of the first device for identifying containment racks, to detect the measurement of mass coming out from the containment rack by means of the first device for measuring the mass of containment racks and to store the measurement of the outgoing mass in the storing means of the containment rack.

Further, the check-in apparatus is able, for each containment rack coming to the analysis point, to identify the containment rack by means of the second device for identifying containment racks, to detect the measurement of the mass coming into the containment rack by means of the second device for measurement of the mass of containment racks and to compare said measurement of the outgoing mass stored in the storing means of the above-mentioned containment rack with the measurement of the incoming mass as detected, thus generating an alert if the measurement of the outgoing mass is different from the measurement of the incoming mass.

The centralized database can be further provided with a suitable management software able to access data and/or information stored in the containment racks and able to carry out the comparison between the above-mentioned measurements. This software can be provided and carry out the above-mentioned comparison also in the embodiments which have been previously described.

Therefore, also in the above-mentioned embodiment, at the drawing point there is provided a preparation apparatus of the containers of biological samples and/or of containment racks whereas at the analysis point it is provided a check-in apparatus of the containers of biological samples and/or of containment racks. The two apparatuses are operatively connected to each other by means of the storing means of each containment rack on which data are stored or extracted which are necessary for the comparisons between the racks coming out from the drawing point and the racks coming to the analysis point. If necessary, the above-mentioned apparatuses may result to be operatively connected by means of the centralized database, as described in the previous embodiments, on which both the preparation apparatus 10 and the check-in apparatus 30 can operate. The operative connection of the above-mentioned apparatuses may also be provided by the simple connection to the management software described in the foregoing.

In the following, it is briefly discussed the operation of the embodiment provided with means for storing containment racks. If a mass variation is detected, the preparation apparatus proceeds with defining, and storing in the storing means of the associated containment rack, the pairing between the identified container and the identified rack. In particular, the pairing is stored in the storing means of the containment rack by adding to the local database, provided in the above-mentioned storing means for each rack, the univocal identifier of the above-mentioned identified container of biological sample. In this case, the pairing with the univocal identifier of the containment rack could not be necessary, since the data are already stored within the containment rack in which the container of biological material has been inserted.

Also in this case, the above-mentioned mass variation can be measured as an absolute measurement or relative to one or more predetermined threshold values, as described in the foregoing. For example, the above-mentioned threshold values can be stored inside the first control device according to the type of container of biological samples to be paired, and then to be indirectly measured. Alternatively, the threshold value or the threshold values can be stored in each of the storing means of the containment racks or, also, in the centralized database which is dedicated to this function.

The mass of the outgoing containment rack, provided with the containers, is then measured by said first mass measurement device to which the rack is coupled, defining the "outgoing mass" of the above-mentioned containment rack. The preparation apparatus proceeds with storing the above-mentioned outgoing mass at the storing means of the containment rack to which it is coupled, proceeding with the operations which are necessary to ensure the following traceability of the rack itself. The above-mentioned steps are repeated for each containment rack going out from said drawing point, that is the preparation apparatus is able, for each outgoing containment rack, to provide the step of identification of the containment rack, of detection of the outgoing mass measurement of said containment rack, and of storing, in the storing means of said containment rack, of the measurement of the mass going out therefrom.

According to a further embodiment, not shown, the traceability system, according to the present invention may not have the centralized database, but may be provided with the containment structure of containment racks, according to what has been described in the corresponding embodiment. In particular, this containment structure is provided with a univocal identifier, with control means, with storing means and with a plurality of housings for storing the respective containment racks.

In this case, the storing and subsequent extraction of data and/or information, such as the "outgoing mass" of each containment rack, may be carried out directly within the storing means of the containment structure, only for the containment racks and/or containers of biological material which are coupled therewith.

The features described with reference to the previous embodiment not provided with the centralized database can be applied, mutatis mutandis, to this last embodiment.

As already mentioned, the features of the present invention also define a method for traceability of transport of containers 55 of biological samples arranged in a containment rack 50 from a drawing point to an analysis point.

The method comprises a step of identification of a containment rack 50 of containers 55 of biological samples going out from the drawing point, by means of a first device 14 for identifying containment racks arranged at the drawing point, a step of operative coupling of the identified containment rack 50 with a first mass measurement device arranged at the drawing point and a step of measurement of the outgoing mass of the identified containment rack 50 and storing of the data of measurement of the outgoing mass in a centralized database 20.

Subsequently, the method comprises a transport step of the containment rack 50 from the drawing point to the analysis point and a step of identification of the containment rack 50 of the containers 55 of biological samples coming into the analysis point, by means of a second device 34 for identifying containment racks arranged at the analysis point.

The method then comprises a step of operative coupling of the identified containment rack 50 with a second mass measurement device arranged at the analysis point, a step of measurement of the incoming mass of the identified containment rack 50 by means of the second mass measurement device and a step of comparison of the measurement of the outgoing mass stored in the centralized database 20 with the detected measurement of the incoming mass, which brings to the generation of an alert if the measurement of the outgoing mass is different from the measurement of the incoming mass.

The method can further comprise a step of identification of a containment structure 150 for the containment of racks 50, the structure 150 being provided with a univocal identifier, with control means, with storing means and with a plurality of housings for storing containment racks 50, the identification occurring by means of a first device for identifying the containment structure 150 arranged at the check-in apparatus 230, a step of insertion of a containment rack 50 into one of the housings of the containment structure 150 after the step of measurement of the outgoing mass of the identified containment rack 50, a step of identification of the containment rack 50 inserted into the housing by means of a third device for identifying containment racks 50, which is operatively connected to the control means and a monitoring step for monitoring the presence of containment racks 50 in the housings during the step of transport of the containment structure 150 from the drawing point to the analysis point.

The method can further comprise a step of insertion of the containment structure 150 and/or of the containment racks 50 into the chamber of a secondary liquid-tight container before the step of transport of the containment rack 50 from the drawing point to the analysis point, a step of maintaining the temperature of the chamber in a predetermined temperature range during the transport step and a step of securing the integrity of the chamber during the transport step.

The method can further comprise a step of recording an alert data by means of the control means if the containment rack 50 is removed from the housing during the transport step and a step of activation of the second device 36 for measuring the mass of containment racks of the check-in apparatus 230 if the containment structure 150, identified by means of the first device for identifying the containment structure, detects stored removal alert data.

The method can further comprise a step of identification of a container 55 of biological samples, by means of a first device 12 for identifying containers of biological samples arranged at the drawing point, a step of insertion of the container 55 of biological samples into the identified containment rack 50, a step of measurement of the mass of the containment rack 50 provided with the container 55 of biological samples, by means of the first mass measurement device and a step of pairing of the identified container 55 of biological samples with the identified containment rack 50 when the first device 16 for measuring the mass of containment racks detects a variation of the measurement of the mass of the identified containment rack 50. The step of pairing of the identified container 55 of biological samples with the identified containment rack 50 can be made when the mass variation exceeds a predetermined threshold value.

The method can further comprise a step of identification of a plurality of containment racks 50, by means of one or more of the first devices 14 for identifying containment racks are arranged at the drawing point, a step of identification of a container 55 of biological samples, by means of a first device 100 for identifying the containers of biological samples arranged at the drawing point, a step of signaling the proper containment rack 50 within which the container 55 of biological samples must be inserted according to the type of biological sample to be transported and/or to the type of analysis to be carried out, by means of a control device able to host a software application to be used as an aid in carrying out the operations of sorting the containers 55 of biological samples and a step of insertion of the container 55 of biological samples into the containment rack 50 which is identified and signaled, by carrying out the sorting of the containers 55 of biological samples according to the type of biological sample to be transported and/or the type of analysis to be carried out.

The method can further comprise a step of measuring the mass variations of the containment rack 50 provided with the container 55 of biological samples, by means of the first mass measurement device, and a step of issuing an alert signal and/or storing the alert signal in the centralized database 20 if the mass variation is negative.

Finally, the method can further comprise a step of identification of a container 55 of biological samples, by means of a first device 12 for identifying the containers of biological samples arranged at the drawing point, a step of retrieving one or more threshold values from an archive of containers operatively connected to the centralized database 20, the threshold values comprising the tare and/or the expected filling volume and/or the expected mass for the type of identified containers 55 of biological samples and a step of issuing an alert signal and/or storing the alert signal in the centralized database 20, if the mass variation of the identified containment rack 50 is lower than one or more of the retrieved threshold values for the identified container 55 of biological samples.

The invention claimed is:

1. A system for traceability of transport of containers of biological samples, arranged in one or more containment racks, from a drawing point to an analysis point, each of said containers of biological samples and each of said containment racks being provided with a univocal identifier, said system comprising:
   at least one preparation apparatus arranged at said drawing point and comprising a first identification device for identifying containment racks and a first measurement device for measuring a mass of the containment racks;
   at least one check-in apparatus arranged at said analysis point and comprising a second identification device for identifying the containment racks and a second measurement device for measuring the mass of the containment racks; and
   a centralized database operatively connected to said preparation apparatus and to said check-in apparatus and configured to store data related to said containers of biological samples and to said containment racks;

wherein said preparation apparatus is configured, for each of said containment racks going out from said drawing point, to identify said containment rack by means of said first identification device, to detect the measurement of the mass of said containment racks going out from said drawing point, by means of said first measurement device for measuring the mass of the containment racks, and to store in said centralized database said measurement of the mass going out from said drawing point, and wherein said check-in apparatus is configured, for each containment rack coming to said analysis point, to identify said containment rack by means of said second identification device, to detect an incoming measurement of the mass of said containment rack by means of said second measurement device for measuring the mass of the containment racks, and to compare said measurement of the mass going out from said drawing point as stored in said centralized database with said incoming measurement of the mass at said analysis point, generating an alert if said measurement of the mass going out from said drawing point is different from said incoming measurement of the mass at said analysis point.

2. The traceability system according to claim comprising a containment structure for containing said containment racks which is provided with a univocal identifier, with control means, with storing means and with a plurality of housings to store said containment racks and wherein said check-in apparatus further comprises a first containment structures identification device, for identifying the containment structures, wherein each housing of said containment structure is provided with a third identification device, for identifying said containment racks, which is operatively connected to said control means and configured to monitor the presence of said containment racks in said housings during the transport of said containment structure from said drawing point to said analysis point, wherein said control means are configured to record an alert data if one or more of said containment racks is removed from said housing during said transport, and wherein said check-in apparatus activates said second measurement device for measuring the mass of containment racks if said containment structure, identified by means of the first containment structures identification device, detects said alert data indicative of said containment rack being removed from said housing during said transport.

3. The traceability system according to claim 2, comprising a liquid-tight secondary container comprising at least one chamber configured to accommodate one or more of said containment structures and/or one or more of said containment racks, wherein said liquid-tight secondary container comprises a cooling device, configured to maintain the temperature of said chamber within a predetermined temperature interval, and a closure device configured to secure an integrity of said chamber during the transport between said drawing point and said analysis point.

4. The traceability system according to claim 3, wherein said liquid-tight secondary container and/or said containment structure comprises one or more sensors configured to monitor one or more physical parameters during said transport between said drawing point and said analysis point, wherein said sensors comprise a temperature sensor, configured to monitor the temperature inside said chamber, and/or a position sensor, configured to monitor the position of said secondary container, and/or an acceleration sensor and/or a light sensor and/or a humidity sensor.

5. The traceability system according to claim 1, wherein said preparation apparatus further comprises another first identification device configured for identifying containers of biological samples, wherein said preparation apparatus is configured to define, and to store in said centralized database, a pairing between said univocal identifier of said containers of biological samples and said univocal identifier of said containment rack when said container of biological samples, identified by said another first identification device of containers of biological samples, is inserted in said containment rack, identified by said first identification device of containment racks.

6. The traceability system according to claim 5, wherein said preparation apparatus is configured to define said pairing between said univocal identifier of said containers of biological samples and said univocal identifier of said containment rack when said first measurement device of the mass of containment racks detects a variation of said measurement of mass of said identified containment rack.

7. The traceability system according to claim 6, wherein said preparation apparatus is configured to define said pairing between said univocal identifier of said containers of biological samples and said univocal identifier of said containment rack when said variation of said measurement of mass of said identified containment rack exceeds a predetermined threshold value.

8. The traceability system according to claim 7, wherein said preparation apparatus is configured to store in said centralized database said variations of said measurement of mass detected for each pairing between said univocal identifier of said containers of biological samples and said univocal identifier of said containment rack.

9. The traceability system according to claim 5, wherein said preparation apparatus comprises a plurality of said first identification devices of containment racks and a plurality of said first measurement devices of the mass of containment racks, each of said first identification devices of containment racks being respectively coupled to one of said first measurement devices of the mass of containment racks, and wherein the traceability system further comprises a control device configured to host a software application configured to assist in carrying out sorting operations of said containers of biological samples, identified by said another first identification device of containers of biological samples, in one or more of said containment racks, identified by said first identification devices of containment racks, according to a type of biological sample to be handled and/or to a type of analysis to be carried out.

10. The traceability system according claim 6, wherein said centralized database is operatively connected with an archive of containers comprising one or more threshold values including a tare and/or an expected filling volume and/or an expected mass of one or more types of containers of biological samples, and wherein said preparation apparatus is configured to issue an alert and/or to store said alert if said variation of mass of said identified containment rack is lower than one or more of said threshold values of said archive of containers.

11. The traceability system according to claim 6, wherein said preparation apparatus is configured to detect a negative variation of said measurement of mass of said identified containment rack, and to issue and/or store a corresponding alert signal into said centralized database.

12. A method for traceability of transport of containers of biological samples arranged in a containment rack from a drawing point to an analysis point, said method comprising the following steps:
   identifying of a containment rack of containers of biological samples going out from the drawing point, by means of a first device for identifying containment racks arranged at the drawing point,
   operatively coupling said identified containment rack with a first mass measurement device arranged at the drawing point,
   measuring the outgoing mass of the identified containment rack and storing the data of measurement of the outgoing mass in a centralized database,
   transporting the containment rack from the drawing point to the analysis point,
   identifying the containment rack of the containers of biological samples coming into the analysis point, by means of a second device for identifying containment racks arranged at the analysis point,
   operatively coupling the identified containment rack with a second mass measurement device arranged at the analysis point,
   measuring an incoming mass of the identified containment rack coming into the analysis point by means of the second mass measurement device, and
   comparing the measurement of the outgoing mass from the drawing point as stored in the centralized database with a detected measurement of the incoming mass to the analysis point, generating an alert if the measurement of the outgoing mass is different from the measurement of the incoming mass.

13. The method according to claim 12, further comprising the steps of:
   identifying a containment structure for the containment of racks, the containment structure being provided with a univocal identifier, with control means, with storing means and with a plurality of housings for storing containment racks, the identification occurring by means of a first device for identifying the containment structure arranged at a check-in apparatus,
   inserting a containment rack into one of the housings of the containment structure after the step of measurement of the outgoing mass from the drawing point of the identified containment rack,
   identifying the containment rack inserted into the housing by means of a third device for identifying containment racks, which is operatively connected to the control means, and
   monitoring the presence of containment racks in the housings during the step of transport of the containment structure from the drawing point to the analysis point.

14. The method according to claim 13, further comprising the steps of:
   inserting the containment structure and/or the containment racks into the chamber of a secondary liquid-tight container before the step of transporting the containment rack from the drawing point to the analysis point,
   maintaining a temperature of the chamber in a predetermined temperature range during the transporting step, and
   securing an integrity of the chamber during said transporting step.

15. The method according to claim 13, further comprising the steps of:
   recording an alert data by means of the control means if the containment rack is removed from the housing during the transporting step, and
   activating the second device for measuring the mass of containment racks of the check-in apparatus if the containment structure, identified by means of the first device for identifying the containment structure, detects stored removal alert data.

16. The method according to claim 12, further comprising the steps of:
   identifying a container of biological samples, by means of another first device for identifying containers of biological samples arranged at the drawing point,
   inserting the container of biological samples into the identified containment rack,
   measuring the mass of the containment rack provided with the container of biological samples, by means of the first mass measurement device, and
   pairing the identified container of biological samples with the identified containment rack when the first device for measuring the mass of containment racks detects a variation of the measurement of the mass of the identified containment rack.

17. The method according to claim 16, wherein said step of pairing of the identified container of biological samples with the identified containment rack is performed when the mass variation exceeds a predetermined threshold value.

18. The method according to claim 17, further comprising the steps of:
   identifying a plurality of containment racks, by means of one or more of the first devices for identifying containment racks which are arranged at the drawing point,
   identifying a container of biological samples, by means of the another first device for identifying the containers of biological samples arranged at the drawing point,
   signaling a proper containment rack within which the container of biological samples must be inserted according to a type of biological sample to be transported and/or to a type of analysis to be carried out, by means of a control device able to host a software application to be used as an aid in carrying out operations of sorting the containers of biological samples, and
   inserting said container of biological samples into the proper containment rack which is identified and signaled, by carrying out the operations of sorting of the containers of biological samples according to the type of biological sample to be transported and/or the type of analysis to be carried out.

19. The method according to claim 16, further comprising the steps of:
   measuring the mass variation of the containment rack provided with the container of biological samples, by means of the first mass measurement device, and
   issuing an alert signal and/or storing the alert signal in the centralized database if the mass variation is negative.

20. The method according to claim 16, further comprising the steps of:
   identifying a container of biological samples, by means of the another first device for identifying the containers of biological samples arranged at the drawing point,
   retrieving one or more threshold values from an archive of containers which is operatively connected to the centralized database, the threshold values comprising a tare and/or an expected filling volume and/or an expected mass for a type of identified containers of biological samples, and issuing an alert signal and/or storing the alert signal in the centralized database, if the mass variation of the identified containment rack is lower than one or more of the retrieved threshold values for the identified container of biological samples.

\* \* \* \* \*